United States Patent Office 3,382,917
Patented May 14, 1968

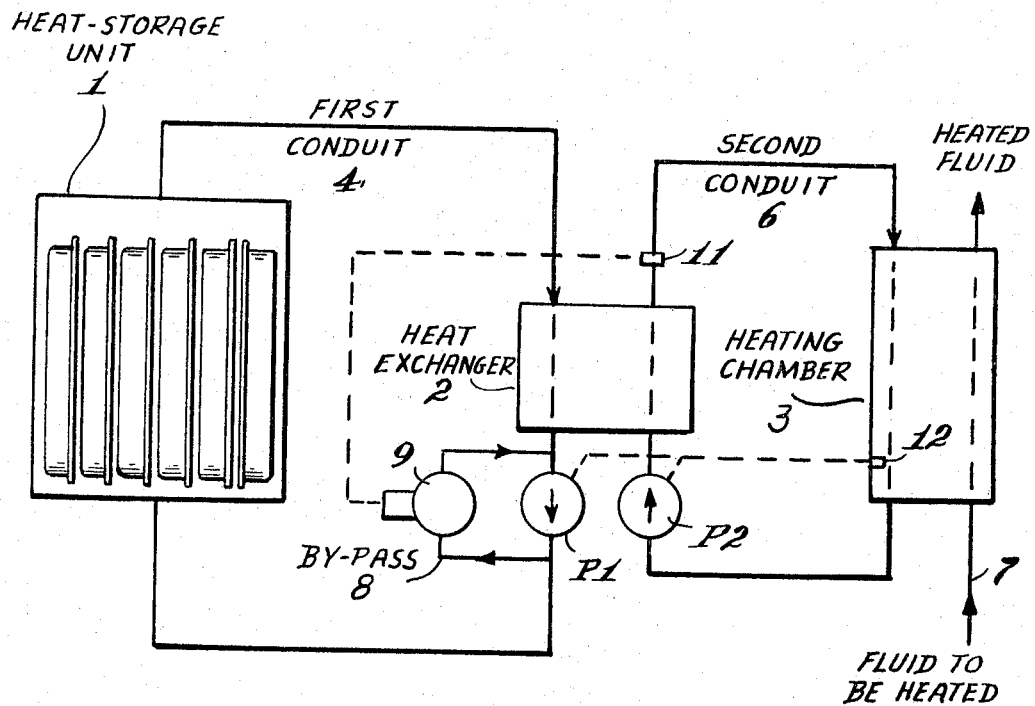

3,382,917
HEATING SYSTEM
Richard E. Rice, Arlington, Mass., assignor to Comstock & Wescott Inc., Cambridge, Mass., a corporation of Massachusetts
Filed Apr. 9, 1965, Ser. No. 446,955
2 Claims. (Cl. 165—39)

In many cases it is desirable to store heat and subsequently use it for heating water, air, or other material. The stored heat may be derived from the sun or from electrical power at off-peak times. Irrespective of what material is used to absorb the heat, the storage units vary widely in temperature, sometimes from a maximum of 1200° F. when freshly charged down to 200° when due for recharging. In heating water or other fluid with these units the tendency is to overheat the fluid when the units are freshly charged and to transfer heat to the fluid too slowly when the units cool.

Objects of the present invention are to provide a heating system in which variations in the temperature of the storage unit does not substantially affect the rate of heat transfer from the unit, which is simple and economical to produce and which is durable and reliable in use.

According to this invention the system comprises a unit in which heat may be stored at widely-varying temperatures, a heat exchanger, a chamber for heating fluid or other heater, a conduit leading from the storage unit to the exchanger through which fluid may be circulated to transfer heat from the unit to the exchanger, a second conduit leading from the exchanger to the heater for transferring heat from the exchanger to the heater, regulating means in the first conduit for varying the rate of heat transfer from the unit to the exchanger, and thermostatic means in the second conduit for controlling the regulating means, whereby wide variations in the temperature of the unit does not substantially affect the rate of heat transfer from the unit to the heater. Preferably the regulating means comprises a circulator and flow modifier. The fluid may be either gas or liquid, the circulator may comprise a blower, pump or fan, and the flow modifier may comprise a by-pass or throttle.

For the purpose of illustration a typical embodiment is shown in the accompanying drawing in which the single figure is a diagrammatic showing of the system.

The particular embodiment of the invention chosen for the purpose of illustration comprises a heat-storage unit 1, a heat exchanger 2, a chamber 3, a conduit 4 for circulating fluid through the storage unit and interchanger for the purpose of transferring heat from the unit to the interchanger, a second conduit 6 leading from the interchanger to the chamber for transferring heat from the interchanger to the chamber and a conduit 7 for conducting fluid through the chamber to be heated. Fluid is circulated through the first conduit by a circulator P1 and through the second conduit by a pump P2. Around the circulator P1 is a by-pass 8 containing a valve 9 controlled by thermostat 11 in the second conduit. The pump P2 is controlled by a thermostat 12 in the heating chamber. The heat-storage unit may be of any suitable construction, as for example that shown in the copending application of Rice and Whitney, Ser. No. 391,676, filed Aug. 24, 1964. The heat exchanger and chamber may be of any well-known construction, it being understood of course that the fluids circulating in the first and second conduits have separate passageways through the interchanger and the fluids in conduits 6 and 7 have separate passageways through the chamber. For example the first conduit may comprise coils in the heat exchanger and the second conduit may comprise coils in the chamber.

The operation of the system is as follows. When the fluid to be heated in chamber 3 tends to cool, the thermostat 12 starts the pump P2 or increases its speed to transfer more heat from the exchanger to the chamber. When the heat-storage unit is freshly charged with heat the temperature is relatively high and the transfer of heat in the exchanger is rapid, the exchange rate decreasing as the storage unit cools. The thermostat 11 is set to open the valve 9 when the exchange rate is high, thereby to decrease the rate of circulation of the fluid from the storage unit to the exchanger, and as the storage unit cools, thereby tending to decrease the rate of heat exchange, the thermostat 11 gradually closes the valve 9 to increase the rate of circulation of the fluid in the first conduit. Thus wide variation in the temperature of the storage unit does not substantially affect the rate of heat transfer to the chamber 3.

From the foregoing it will be understood that the illustrative embodiment of the system comprises a unit 1 in which heat may be stored at widely-varying temperatures, a heat exchanger 2, a chamber for heating fluid 3, a conduit 4 leading from the storage unit to the exchanger through which fluid may be circulated to transfer heat from the unit to the exchanger, a second conduit 6 leading from the exchanger to the chamber for transferring heat from the exchanger to the chamber, regulating means in the first conduit for varying the rate of heat transfer from the unit to the exchanger, and thermostatic means 11 in the second conduit for controlling the regulating means, the regulating means comprising a circulator P1 in the first conduit and a by-pass 8 around the circulator and a valve 9 for regulating the proportion of fluid flowing through the by-pass, the valve being controlled by the aforesaid thermostatic means.

It should be understood that the present disclosure is for the purpose of illustration only and that this invention includes all modifications and equivalents which fall within the scope of the appended claims.

I claim:
1. A heat transfer system comprising a source of heat of widely-varying temperature means operated by heat from said source, a heat exchanger between said source and means, a conduit leading from said source to said exchanger and back to said source through which fluid may be circulated to transfer heat from the unit source to the exchanger, a second conduit leading from the exchanger to said means and back to said exchanger for transferring heat from the exchanger to said means, regulating means in said first conduit for varying the rate of heat transfer from the source to the exchanger, and thermostatic means in said second conduit for controlling said regulating means, whereby wide variations in the temperature of said source do not substantially affect the rate of heat transfer to said means.

2. A heat transfer system according to claim 1 wherein said regulating means comprises a circulator in said first conduit, a by-pass around the circulator and a valve for regulating the proportion flowing through the circulator and by-pass respectively, and wherein said thermostatic means controls said valve.

References Cited

UNITED STATES PATENTS 3,064,649  11/1962  Fuson _____ 165—26
3,255,084   6/1966  Doroszlai _____ 165—39

ROBERT A. O'LEARY, Primary Examiner.
CHARLES SUKALO, Examiner.